United States Patent
Schwarz et al.

(10) Patent No.: US 10,472,071 B2
(45) Date of Patent: Nov. 12, 2019

(54) HYBRID COMPRESSOR BLEED AIR FOR AIRCRAFT USE

(71) Applicant: United Technologies Corporation, Hartford, CT (US)

(72) Inventors: Frederick M. Schwarz, Glastonbury, CT (US); Stephen G. Pixton, SouthWindsor, CT (US)

(73) Assignee: United Technologies Corporation, Farmington, CT (US)

( * ) Notice: Subject to any disclaimer, the term of this patent is extended or adjusted under 35 U.S.C. 154(b) by 694 days.

(21) Appl. No.: 14/737,580

(22) Filed: Jun. 12, 2015

(65) Prior Publication Data

US 2016/0009399 A1    Jan. 14, 2016

Related U.S. Application Data

(60) Provisional application No. 62/022,238, filed on Jul. 9, 2014.

(51) Int. Cl.
  *B64D 13/02*   (2006.01)
  *F01D 5/06*   (2006.01)
  (Continued)

(52) U.S. Cl.
  CPC ............ *B64D 13/02* (2013.01); *B64D 27/10* (2013.01); *F01D 5/06* (2013.01); *F01D 17/105* (2013.01);
  (Continued)

(58) Field of Classification Search
  CPC ....... B64D 13/02; B64D 27/10; F01D 17/105; F01D 5/06; F02C 6/08; F02C 9/18;
  (Continued)

(56) References Cited

U.S. PATENT DOCUMENTS 4,523,517 A * 6/1985 Cronin ................... B64D 13/06
                                                                237/2 A
6,305,156 B1    10/2001 Lui
                        (Continued)

FOREIGN PATENT DOCUMENTS

EP    2213864 A2    8/2010
EP    2620616 A2    7/2013
                (Continued)

OTHER PUBLICATIONS

European Search Report and European Application No. 15175883.6 dated Dec. 4, 2015.

(Continued)

*Primary Examiner* — William M McCalister
(74) *Attorney, Agent, or Firm* — Carlson, Gaskey & Olds, P.C.

(57) ABSTRACT

A gas turbine engine comprises at least two compressor rotors, including a first lower pressure compressor rotor and a second higher pressure compressor rotor. At least two corresponding air taps include a low tap for tapping low pressure compressor air from a location downstream of a first stage of the lower pressure compressor rotor, and upstream of a first stage of the higher pressure compressor rotor, and a high tap to tap air downstream of the first stage of the higher pressure compressor rotor. an air handling system selectively communicates both the low tap and the high tap to an air use destination. Air is selectively supplied from the low tap to the air handling system at a high power operation and from the high tap to the air handling system at a low power operation.

19 Claims, 2 Drawing Sheets

(51) Int. Cl.
*F01D 17/10* (2006.01)
*B64D 27/10* (2006.01)
*F02K 3/06* (2006.01)
*F02C 6/08* (2006.01)
*F02C 9/18* (2006.01)

(52) U.S. Cl.
CPC .. *F05D 2220/32* (2013.01); *F05D 2220/3217* (2013.01); *F05D 2220/3218* (2013.01); *F05D 2260/213* (2013.01); *F05D 2260/606* (2013.01)

(58) Field of Classification Search
CPC ............... F02K 3/06; F05D 2220/32; F05D 2220/3217; F05D 2220/3218; F05D 2220/3219; F05D 2260/213; F05D 2260/40311; F05D 2260/606; Y02T 50/676
See application file for complete search history.

(56) References Cited

U.S. PATENT DOCUMENTS

| | | | |
|---|---|---|---|
| 6,543,234 B2 | 4/2003 | Anand et al. | |
| 6,634,597 B2* | 10/2003 | Johnson | B64D 13/00 244/118.5 |
| 8,267,122 B2 | 9/2012 | Weber et al. | |
| 8,397,487 B2* | 3/2013 | Sennoun | B64D 13/06 60/266 |
| 8,408,009 B2 | 4/2013 | Blanchard et al. | |
| 8,572,996 B2 | 11/2013 | Dittmar et al. | |
| 8,769,962 B2* | 7/2014 | Glahn | F01D 25/18 60/39.08 |
| 8,955,794 B2* | 2/2015 | Mackin | F02C 6/08 244/134 R |
| 9,580,180 B2* | 2/2017 | Jonqueres | B64D 13/08 |
| 9,656,755 B2* | 5/2017 | Durbin | B64D 13/08 |
| 2013/0187007 A1* | 7/2013 | Mackin | F02C 6/08 244/134 R |

FOREIGN PATENT DOCUMENTS

| | | |
|---|---|---|
| EP | 2960468 A1 | 12/2015 |
| WO | 2014055106 A1 | 4/2014 |

OTHER PUBLICATIONS

European Search Report for EP Application No. 18215301.5 dated Apr. 8, 2019.

* cited by examiner

HYBRID COMPRESSOR BLEED AIR FOR AIRCRAFT USE

CROSS-REFERENCE TO RELATED APPLICATION

This application claims priority to U.S. Provisional Patent Application No. 62/022,238, filed Jul. 9, 2014.

BACKGROUND OF THE INVENTION

This application relates to a unique arrangement of bleed taps for compressed air for use on an aircraft associated with a gas turbine engine.

Gas turbine engines are known and utilized on aircraft. In a known gas turbine engine, a fan delivers air into a compressor section where the air is compressed. Typically, there are at least two compressor rotors with a lower pressure compressor and a higher pressure compressor. The compressed air is delivered into a combustion section where it is mixed with fuel and ignited. Products of this combustion pass downstream over at least two turbine rotors driving them to rotate. The turbine rotors, in turn, cause the fan rotor and compressor rotors to rotate.

While the gas turbine engine is utilized as a source of propulsion, it also supplies power and air to an associated aircraft. Thus, it is known to tap compressed air, typically, from an intermediate or downstream location associated with the higher pressure compressor rotor. The tapped air is utilized for various purposes and, in particular, delivered to an air pack where air is processed for use as environmental air, such as in a cabin of an associated aircraft. The air also provides other functions, such as pressurizing the fuselage of the aircraft.

The air tapped from these high pressure compressor locations has variable temperature and pressure, dependent on the point of the operation of the associated aircraft. As an example, at high energy times, such as take-off, the pressures are very high.

At times, the pressure is far too high as are the temperatures for the intended uses. Thus, it is known to pass the air from the high pressure compressor tap through a heat exchanger.

The fans in typical aircraft gas turbine engines deliver a portion of the air into a bypass duct where it is utilized as propulsion air and another portion into the low pressure compressor.

The air in the bypass duct is utilized to cool the tapped air.

Further conditioning is performed at the air conditioning pack and before the air is delivered into the cabin.

Thus, in particular at high power operation, the tapped high pressure compressor air must be cooled and lowered in pressure before being utilized on these aircraft functions or further conditioned at the air conditioning pack.

This results in loss of efficiency as the air has been compressed and then has its pressure lowered. In addition, a portion of fan air, which is otherwise used for propulsion, is undesirably heated in the heat exchanger.

These losses of efficiency not only simply cost fuel, they also raise challenges. As an example, due to the inefficient operation, the temperatures from the higher pressure turbine rotor reaching the last stage of turbine rotor are undesirably high. Thus, a mid-turbine duct, which serves to condition the flow of the product of combustion between the turbine rotors must be highly engineered and may need to include expensive materials.

SUMMARY OF THE INVENTION

In a featured embodiment, a gas turbine engine comprises at least two compressor rotors, including a first lower pressure compressor rotor and a second higher pressure compressor rotor. At least two corresponding air taps include a low tap for tapping low pressure compressor air from a location downstream of a first stage of the lower pressure compressor rotor, and upstream of a first stage of the higher pressure compressor rotor, and a high tap to tap air downstream of the first stage of the higher pressure compressor rotor. an air handling system selectively communicates both the low tap and the high tap to an air use destination. Air is selectively supplied from the low tap to the air handling system at a high power operation and from the high tap to the air handling system at a low power operation.

In another embodiment according to the previous embodiment, at least one valve controls the selective supply of the low tap and high tap to the air handling system.

In another embodiment according to any of the previous embodiments, the high tap taps air from an intermediate location in the higher pressure compressor rotor.

In another embodiment according to any of the previous embodiments, the high tap also taps air from a location downstream of a downstream most stage of the higher pressure compressor rotor.

In another embodiment according to any of the previous embodiments, the high tap taps air from a location downstream of a downstream most stage of the higher pressure compressor rotor.

In another embodiment according to any of the previous embodiments, the supply duct passes through a heat exchanger before being delivered to the use.

In another embodiment according to any of the previous embodiments, a fan delivers air into a bypass duct and to the lower pressure compressor rotor, and air from the bypass duct cooling the air heat exchanger.

In another embodiment according to any of the previous embodiments, the lower pressure compressor rotor has at least four stages.

In another embodiment according to any of the previous embodiments, the lower pressure compressor rotor has four or five stages.

In another embodiment according to any of the previous embodiments, the higher pressure compressor rotor has between 6 and 13 stages.

In another embodiment according to any of the previous embodiments, the use includes pressurizing a fuselage of an associated aircraft.

In another embodiment according to any of the previous embodiments, the use includes an air conditioning pack for conditioning air for use in a cabin of an associated aircraft.

In another embodiment according to any of the previous embodiments, the higher pressure compressor rotor has between 6 and 13 stages.

In another embodiment according to any of the previous embodiments, the use includes pressurizing a fuselage of an associated aircraft.

In another embodiment according to any of the previous embodiments, the use includes an air conditioning pack for conditioning air for use in a cabin of an associated aircraft.

In another embodiment according to any of the previous embodiments, the use includes an air conditioning pack for conditioning air for use in a cabin of an associated aircraft.

In another embodiment according to any of the previous embodiments, a bypass ratio is defined by the volume of air delivered into the bypass duct, compared to the volume of air delivered into the lower pressure compressor rotor and wherein the bypass ratio is greater than or equal to 10.

In another embodiment according to any of the previous embodiments, the bypass ratio is greater than or equal to 12.0.

In another embodiment according to any of the previous embodiments, a fan rotor is driven through a gear reduction by a fan drive turbine.

In another embodiment according to any of the previous embodiments, the fan drive turbine further driving the lower pressure compressor rotor.

In another embodiment according to any of the previous embodiments, a gear ratio of the gear reduction is greater than or equal to 2.6.

In another embodiment according to any of the previous embodiments, the high tap includes at least two different tap locations, and the two different tap locations are selectively utilized at different operational conditions.

These and other features may be best understood from the following drawings and specification.

DETAILED DESCRIPTION

Figure 1:
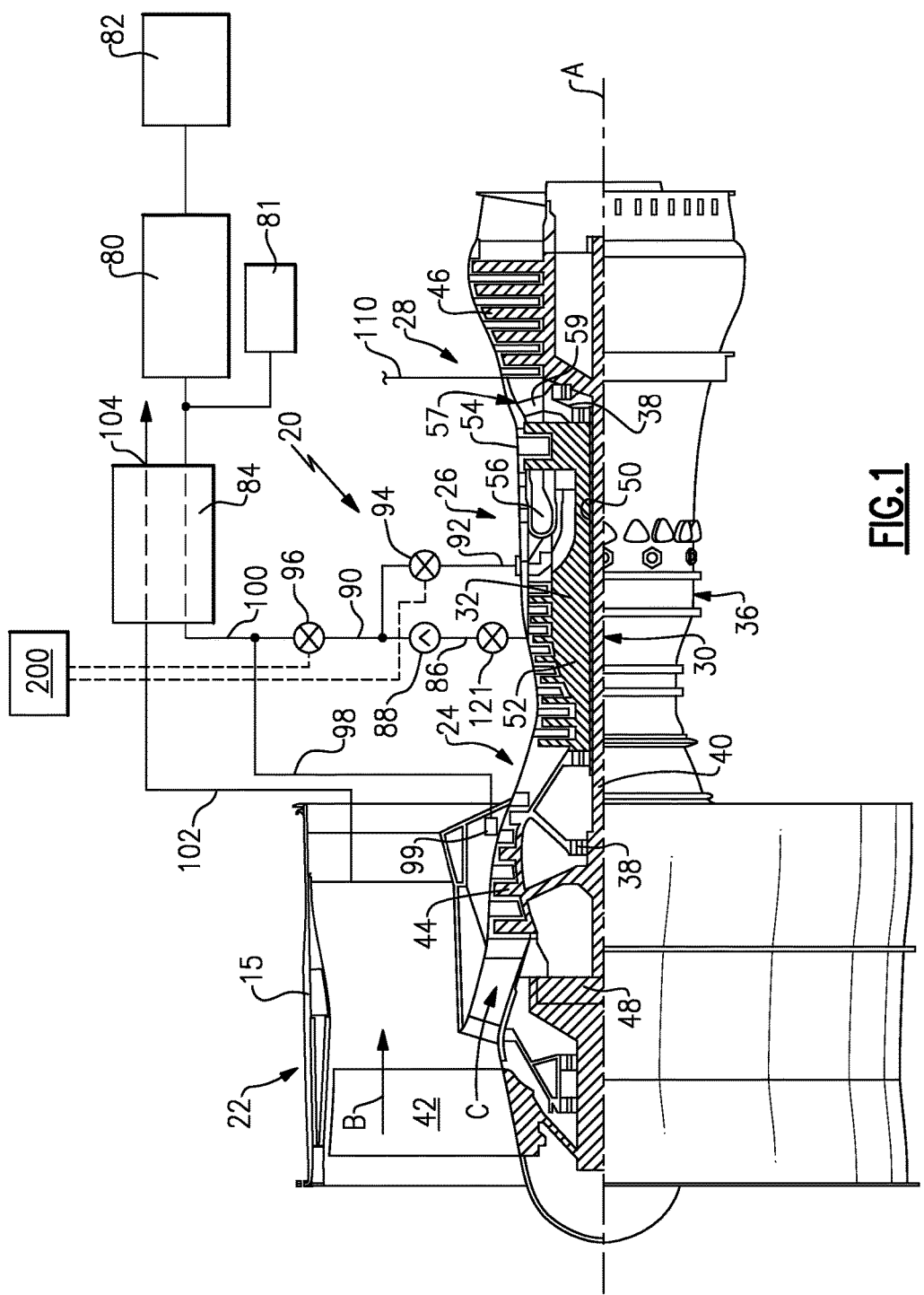
FIG. 1 schematically shows a gas turbine engine in a first embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The FIG. 1 engine 20, as illustrated, includes a unique compressor tap system. As shown, an air conditioning pack and cabin pressurization system 80 delivers air into an aircraft cabin 82. Air is also delivered to pressurize a fuselage 81, as described above. A heat exchanger 84, which may be similar to that and known in the prior art, is positioned upstream of the pack 80 and fuselage 81.

A tap 86 taps a compressed air from an intermediate location in higher pressure compressor rotor 52. The air passes through a check valve 88, into a line 90 leading to a control valve 96, and then to the heat exchanger 84. An alternative or supplemental tap 92 taps air from a location downstream of a downstream most stage in the high pressure compressor rotor 52. This air passes through a valve 94 and into the line 90.

The system, as described to this point, is generally as known in the art. A controller 200 controls valves 94 and 96 to deliver air into the heat exchanger 84 for use on the associated aircraft.

A manifold 99 (shown schematically) is also positioned at a location associated with the lower pressure compressor rotor 44 and taps air into a tap line 98. Tap line 98 mixes with air at a line 100 downstream of the valve 96.

An air tap 102 passes through the heat exchanger 84 and then exits at 104 to mix with the remainder of the fan bypass stream. While the tap 102 is shown radially outwardly of nacelle 15, it should be understood this is a schematic representation and the heat exchanger 84 may actually be positioned in the path of the bypass air. Also, some of the components might be located on the engine, and others in an engine pylon. A worker of ordinary skill in the art can make the appropriate selection based upon the size and shapes of the components involved.

Cooling air 110 is shown being delivered into a mid-turbine duct 57. As will be described, the system illustrated in FIG. 1 provides increased efficiencies, such that the temperature of the products of combustion reaching the duct 57 is reduced and the duct 57 is no longer necessarily highly engineered. That is, when the mid-turbine duct faces higher temperatures, more expensive materials, and more extensive structural features may be required. By the lowering of the temperatures achieved by the above disclosure, the mid-turbine duct may not need such careful design. Thus, the cooling load on air 110 is lowered.

The control 200 utilizes air from the tap 98 when possible. At flight conditions, such as cruise idle, the pressure at the manifold 99 may not be sufficient to fully meet the requirements for fuselage 81 pressurization or use by the air conditioning pack 80. However, at higher power, such as take-off, climb or landing, the pressure in tap 98 is sufficient to meet the needs. Thus, the control 200 may maintain valve 96 in a closed configuration during the higher power operation such that only the tap 98 is utilized. At lower power operation, such as cruise or idle, the valve 96 and valve 94 may be opened to allow the air from the taps 86 or 92 to reach the heat exchanger 84. As needed, if the pressure provided at the manifold 99 is insufficient, the higher pressures from the taps 86 and/or 92 may be utilized.

With this combination, the overall operation of the engine is improved. The temperatures reaching the mid-turbine duct 57 are reduced and the engineering of the mid-turbine duct 57 is simplified. In addition, the cooling load for the cooling tap 110 is greatly reduced.

Figure 2:
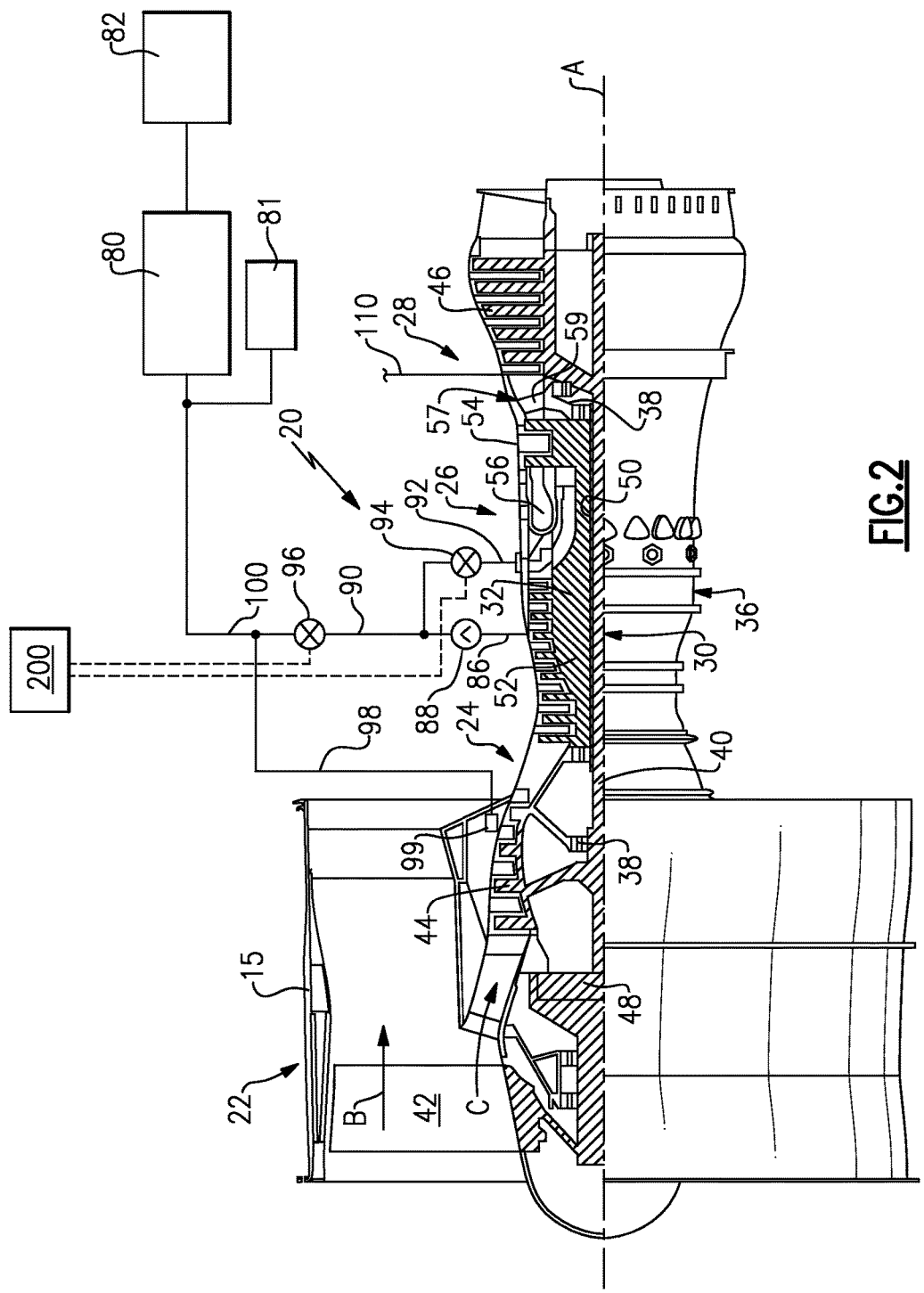
FIG. 2 schematically shows a second embodiment.

FIG. 2 shows an embodiment 120 wherein the temperatures provided due to the use of the tap 98 are sufficiently low such that the heat exchanger 84 can be eliminated. FIG. 2 is otherwise generally identical to the FIG. 1 embodiment.

In embodiments, the low pressure compressor section 44 has at least four stages and, in one embodiment, four to five stages. The high pressure compressor 52 has between 6 and 13 stages. The bypass ratio may be 9 or greater and in embodiments 12 or greater. A gear ratio of the gear reduction 48 may be 2.6 or greater. The mid-turbine duct 57 may include a turning vane.

The disclosed system increases the efficiency operation of the engine and, thus, provides fuel savings and further reduces the complexity of designing a mid-turbine duct.

In sum, the disclosed embodiments relate to a gas turbine engine that comprises at least two compressor rotors 44/52 with a first lower pressure compressor rotor 44 and a second higher pressure compressor rotor 52. A tap 98 taps low pressure compressor air from a location downstream of a first stage of the lower pressure compressor rotor, but upstream of a first stage of the higher pressure compressor rotor. A high pressure compressor tap 86/92 taps air downstream of the first stage of the higher pressure compressor rotor. Supply ducts 98/100/90 selectively communicate both the lower pressure compressor tap and the higher pressure compressor tap to an air use system 81/82 on an associated aircraft. A valve 96 selectively communicates the lower pressure compressor tap to the use at higher power operation of the gas turbine engine and selectively supplies air from the higher pressure compressor tap at lower power operation of the gas turbine engine.

The higher pressure compressor tap may tap air from an intermediate location 96 in the higher pressure compressor rotor. The higher pressure compressor tap may also tap air from a location 92 downstream of a downstream most stage of the higher pressure compressor rotor.

While the locations 86 and 92 may both be used in combination, they may also be used selectively based upon certain operational features. As an example, if an additional valve 121 were incorporated onto tap 86, tap 86 may be utilized at low altitude idle, while tap 92 can be utilized on higher altitude idle. Air from the location 92 would tend to be extremely hot, and thus best used at very low power operational conditions.

The disclosure could also apply to a direct drive engine, including one with three turbines. In such engines, a first turbine drives an upstream compressor section, a second turbine drives a downstream compression section, and the third turbine is a fan drive turbine. In such an engine, a bypass ratio of 6 or above could be utilized, wherein the low pressure tap may be after the third stage of the low pressure compressor.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine and an air use destination on a fuselage of an associated aircraft comprising:
    at least two compressor rotors, including a first lower pressure compressor rotor and a second higher pressure compressor rotor;
    at least two corresponding air taps, including:
    a low tap for tapping low pressure compressor air from a location downstream of a first stage of the lower pressure compressor rotor, and upstream of a first stage of the higher pressure compressor rotor;
    a high tap to tap air downstream of said first stage of said higher pressure compressor rotor;
    an air handling system and an air use destination, wherein said air handling system selectively communicates both said low tap and said high tap to said air use destination, wherein said air use destination includes a fuselage of an associated aircraft;

wherein air is selectively supplied from the low tap to the air handling system at a high power operation and from said high tap to the air handling system at a low power operation; and at least one valve controls the selective supply of the high tap to the air handling system;

wherein said air use destination includes pressurizing a fuselage of an associated aircraft; and said low power operation including at least cruise and idle, and said high power operation including at least take-off of the gas turbine engine.

2. The gas turbine engine and an air use destination on a fuselage of an associated aircraft as set forth in claim 1, wherein said high tap taps air from an intermediate location in said higher pressure compressor rotor.

3. The gas turbine engine and an air use destination on a fuselage of an associated aircraft as set forth in claim 2, wherein said high tap also taps air from a location downstream of a downstream most stage of said higher pressure compressor rotor.

4. The gas turbine engine and an air use destination on a fuselage of an associated aircraft as set forth in claim 1, wherein said high tap taps air from a location downstream of a downstream most stage of said higher pressure compressor rotor.

5. The gas turbine engine and an air use destination on a fuselage of an associated aircraft as set forth in claim 1, wherein said supply duct passes through a heat exchanger before being delivered to said use.

6. The gas turbine engine and an air use destination on a fuselage of an associated aircraft as set forth in claim 5, wherein a fan delivers air into a bypass duct and to said lower pressure compressor rotor, and air from said bypass duct cooling said heat exchanger.

7. The gas turbine engine and an air use destination on a fuselage of an associated aircraft as set forth in claim 1, wherein said lower pressure compressor rotor has at least four stages.

8. The gas turbine engine and an air use destination on a fuselage of an associated aircraft as set forth in claim 7, wherein said lower pressure compressor rotor has four or five stages.

9. The gas turbine engine and an air use destination on a fuselage of an associated aircraft as set forth in claim 8, wherein said higher pressure compressor rotor has between 6 and 13 stages.

10. The gas turbine engine and an air use destination on a fuselage of an associated aircraft as set forth in claim 9, wherein said use includes an air conditioning pack for conditioning air for use in a cabin of an associated aircraft.

11. The gas turbine engine and an air use destination on a fuselage of an associated aircraft as set forth in claim 1, wherein said higher pressure compressor rotor has between 6 and 13 stages.

12. The gas turbine engine and an air use destination on a fuselage of an associated aircraft as set forth in claim 1, wherein said use includes an air conditioning pack for conditioning air for use in a cabin of an associated aircraft.

13. The gas turbine engine and an air use destination on a fuselage of an associated aircraft as set forth in claim 1, wherein a bypass ratio is defined by the volume of air delivered into said bypass duct, compared to the volume of air delivered into said lower pressure compressor rotor and wherein said bypass ratio is greater than or equal to 10.

14. The gas turbine engine and an air use destination on a fuselage of an associated aircraft as set forth in claim 13, wherein said bypass ratio is greater than or equal to 12.0.

15. The gas turbine engine and an air use destination on a fuselage of an associated aircraft as set forth in claim 1, wherein a fan rotor is driven through a gear reduction by a fan drive turbine.

16. The gas turbine engine and an air use destination on a fuselage of an associated aircraft as set forth in claim 15, wherein said fan drive turbine further driving said lower pressure compressor rotor.

17. The gas turbine engine and an air use destination on a fuselage of an associated aircraft as set forth in claim 16, wherein a gear ratio of said gear reduction is greater than or equal to 2.6.

18. The gas turbine engine and an air use destination on a fuselage of an associated aircraft as set forth in claim 17, wherein said use includes an air conditioning pack for conditioning air for use in a cabin of an associated aircraft.

19. The gas turbine engine and an air use destination on a fuselage of an associated aircraft as set forth in claim 1, wherein said high tap includes at least two different tap locations, and the two different tap locations are selectively utilized at different operational conditions.

\* \* \* \* \*